(12) United States Patent
Rao et al.

(10) Patent No.: US 7,965,799 B2
(45) Date of Patent: *Jun. 21, 2011

(54) BLOCK BOUNDARY DETECTION FOR A WIRELESS COMMUNICATION SYSTEM

(75) Inventors: Raghavendar M. Rao, Austin, TX (US); Christopher H. Dick, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 639 days.

This patent is subject to a terminal disclaimer.

(21) Appl. No.: 12/037,037

(22) Filed: Feb. 25, 2008

(65) Prior Publication Data

US 2009/0213947 A1 Aug. 27, 2009

(51) Int. Cl.
*H04L 27/06* (2006.01)
(52) U.S. Cl. ........ 375/343; 375/260; 375/340; 375/354; 370/203; 370/204; 370/206; 370/208; 370/210; 327/141; 455/502
(58) Field of Classification Search .................. 375/260, 375/340, 343, 354; 370/203, 204, 206, 208, 370/210; 327/141; 455/502
See application file for complete search history.

(56) References Cited

U.S. PATENT DOCUMENTS

| | | | |
|---|---|---|---|
| 5,914,616 A | 6/1999 | Young et al. | |
| 6,385,259 B1 | 5/2002 | Sung et al. | |
| 7,286,617 B2 | 10/2007 | Vanderperren et al. | |
| 7,406,102 B2 | 7/2008 | Boesel et al. | |
| 7,415,080 B2 | 8/2008 | Echavarri et al. | |
| 7,539,241 B1 * | 5/2009 | Dick | 375/152 |
| 2004/0052319 A1 | 3/2004 | Wakamatsu | |
| 2004/0071104 A1 | 4/2004 | Boesel et al. | |
| 2005/0013383 A1 | 1/2005 | Sudo et al. | |
| 2005/0152317 A1 | 7/2005 | Awater et al. | |

FOREIGN PATENT DOCUMENTS

JP 2000-278178 A 10/2000

OTHER PUBLICATIONS

Xilinx, Inc., "The Programmable Logic Data Book 2000," Jan. 28, 2000, pp. 3-75 to 3-96, available from Xilinx, Inc., 2100 Logic Drive, San Jose, California 95124.

Xilinx, Inc., "Virtex-II Pro Platform FPGA Handbook," Oct. 2002, pp. 19 to 71, available from Xilinx, Inc., 2100 Logic Drive, San Jose, California 95124.

Xilinx, Inc., "Virtex-II Platform FPGA Handbook," Dec. 2000, pp. 33-75, available from Xilinx, Inc., 2100 Logic Drive, San Jose, California 95124.

(Continued)

*Primary Examiner* — Leon Flores
(74) *Attorney, Agent, or Firm* — W. Eric Webostad; Kevin T. Cuenot

(57) ABSTRACT

Method and apparatus for block boundary detection is described. A signal is received. The signal is quantized to provide a quantized signal to at least one correlator, the quantized signal being a sequence of samples. The sequence of samples and a reference template including totaling partial results from the at least one correlator are cross-correlated to provide a result, the result being a symbol timing synchronization responsive to the cross-correlation also known as block boundary detection. The cross-correlation is provided in part by combining by exclusive-ORing a regression vector obtained from the sequence of samples and a coefficient term vector obtained from the reference template.

20 Claims, 7 Drawing Sheets

OTHER PUBLICATIONS

Chris Dick et al., "FPGA implementation of an OFDM PHY", Signals, Systems and Computers, 2003, Conference Record of the Thirty-Seventh Asilomar Conference, Nov. 9-12, 2003, pp. 905-909 vol. 1, available from Xilinx, Inc., 2100 Logic Drive, San Jose, CA 95124.

U.S. Appl. No. 10/972,121, filed Oct. 22, 2004, Christopher H. Dick, entitled ,"A Packet Detector for a Communication System", Xilinx, Inc. 2100 Logic Drive, San Jose, CA.

Heiskala ,J. and Terry, J., OFDM Wireless Lans: A Theoretical and Practical Guide, Sam Publishing, 2002, Chapter 1, Background and WLAN Overview, p. 1-46.

Schmidl, T.M. and Cox, D.C., "ow —Overhead, Low Complexity [Burst] synchronization of OFDM," IEEE International Conference on Communications, vol. 3, pp. 1301-1306, 1996.

Hu,Ye Hen, "Cordic-Based VLSI Architectures for Digital Signal Processing", IEEE Signal Processing Magazine , pp. 16-35, Jul. 1992.

Xilinx, Inc. Systems Generator for DSP, http//www.xilinx.com/ise/optional_prod/systems_generator.htm website dated Dec. 18, 2008, 1 page.

The Mathworks, Inc. Using Simulink, 2002, http://www.mathworks.com/products/simulink/ website dated Dec. 18, 2008, 2 pages.

* cited by examiner

US 7,965,799 B2

BLOCK BOUNDARY DETECTION FOR A WIRELESS COMMUNICATION SYSTEM

FIELD OF THE INVENTION

One or more aspects of the invention relate generally to data block detection and more particularly, to block boundary detection for a wireless communication system based on Orthogonal Frequency Division Multiplexing or Orthogonal Frequency Division Multiple Access.

BACKGROUND OF THE INVENTION

Orthogonal Frequency Division Multiplexing ("OFDM") is widely used and is useful where communication channels exhibit severe multi-path interference. OFDM divides a signal waveform into orthogonal signals ("subcarriers") sending multiple symbols in parallel. When these subcarriers are distributed among multiple subscriber stations or users, the system may be referred to as Orthogonal Frequency Division Multiple Access ("OFDMA") system. In order to promote industry standardization, communication protocols may include Medium Access Control ("MAC") and Physical Layer ("PHY") specifications for OFDM communication system components. Institute for Electronic and Electrical Engineers ("IEEE") wireless local area network ("WLAN") specification (e.g., IEEE 802.11a/g/n or "Wi-Fi"), wireless metropolitan area network ("WirelessMAN") specification (e.g., IEEE 802.16 or Worldwide Interoperability for Microwave Access ("WiMax")), and associated mobile specification (e.g., mobile WiMax or IEEE 802.16e), among other examples of OFDM/OFDMA hardware specifications, are promoted for compliance. Though these examples of wireless specifications are used, it should be appreciated that other wireless communication specifications may be used.

Signal computation requirements of an OFDM communication system, such as arithmetic calculations in particular, may be very demanding. By way of example, these arithmetic calculations may be in the billions operations per second, which may be beyond the capacity of conventional Digital Signal Processors. Additionally, circuitry to support billions of operations per second for OFDM communication conventionally is costly.

SUMMARY OF THE INVENTION

Accordingly, it would be desirable and useful to provide a block boundary detector for an OFDM/OFDMA communication systems that employs less circuitry than previously used.

One or more aspects of the invention relate generally to data block detection and more particularly, to block boundary detection for a wireless communication system based on Orthogonal Frequency Division Multiplexing ("OFDM") or Orthogonal Frequency Division Multiple Access ("OFDMA") (hereinafter collectively or singly "OFDM/OFDMA").

An aspect of the invention is a method for block boundary detection. A received signal is quantized to provide a quantized signal to at least one correlator, where the quantized signal is a sequence of samples. The sequence of samples and a reference template including totaling partial results from the at least one correlator are cross-correlated to provide a result, the result being a symbol timing synchronization responsive to the cross-correlation. The cross-correlation is provided in part by combining by exclusive-ORing a regression vector obtained from the sequence of samples and a coefficient term vector obtained from the reference template.

Another aspect of the invention is a method for block boundary detection for when a system clock is sufficiently faster than a symbol clock rate, including: receiving an OFDM signal having orthogonal sub-signals; quantizing the OFDM signal to provide a quantized signal, the quantized signal being a sequence of samples; and obtaining a cross-correlation result as between the sequence of samples and a reference template. The cross-correlation result obtained in by: dividing the sequence of samples of correlation length L into respective portions of sub-correlation length N for L and N integers greater than zero; combining by respectively exclusive-ORing each sample within each of the portions of the sequence of samples with a respective coefficient obtained from the reference template to provide interim partial cross-correlation results; and adding the interim partial cross-correlation results to provide a cross-correlation result.

Yet another aspect of the invention is a cross-correlator for a block of information detector, including: a re-quantizer coupled to receive an input, the input being an OFDM signal having orthogonal sub-signals for providing symbols in parallel; sub-correlators coupled to the re-quantizer to obtain a sequence of samples responsive to the input. The sub-correlators including: an address sequencer configured to provide a sequence of vector addresses and an associated sequence of coefficient addresses; vector storage coupled to receive the sequence of samples and to store at least a portion of the sequence of samples, where the vector storage is coupled to receive a vector address of the sequence of vector addresses and is configured to provide a digital vector associated with a sample of the portion of the sequence of samples stored in the vector storage and located at the vector address received; coefficient storage coupled to receive a coefficient address of the sequence of coefficient addresses and configured to provide a digital coefficient responsive to the coefficient address received, where the coefficient storage is configured to store at least a portion of a preamble of a block of information; an array of exclusive-OR gates coupled to receive the digital vector and the digital coefficient; and an adder tree coupled to the array of exclusive-OR gates configured to add output obtained from the array of exclusive-OR gates to provide a digital cross-correlation result to acquire symbol timing of the input.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different. As used herein, the terms "block boundary detection," "symbol timing acquisition," and "symbol boundary detection" are generally used interchangeably.

Figure 1A:
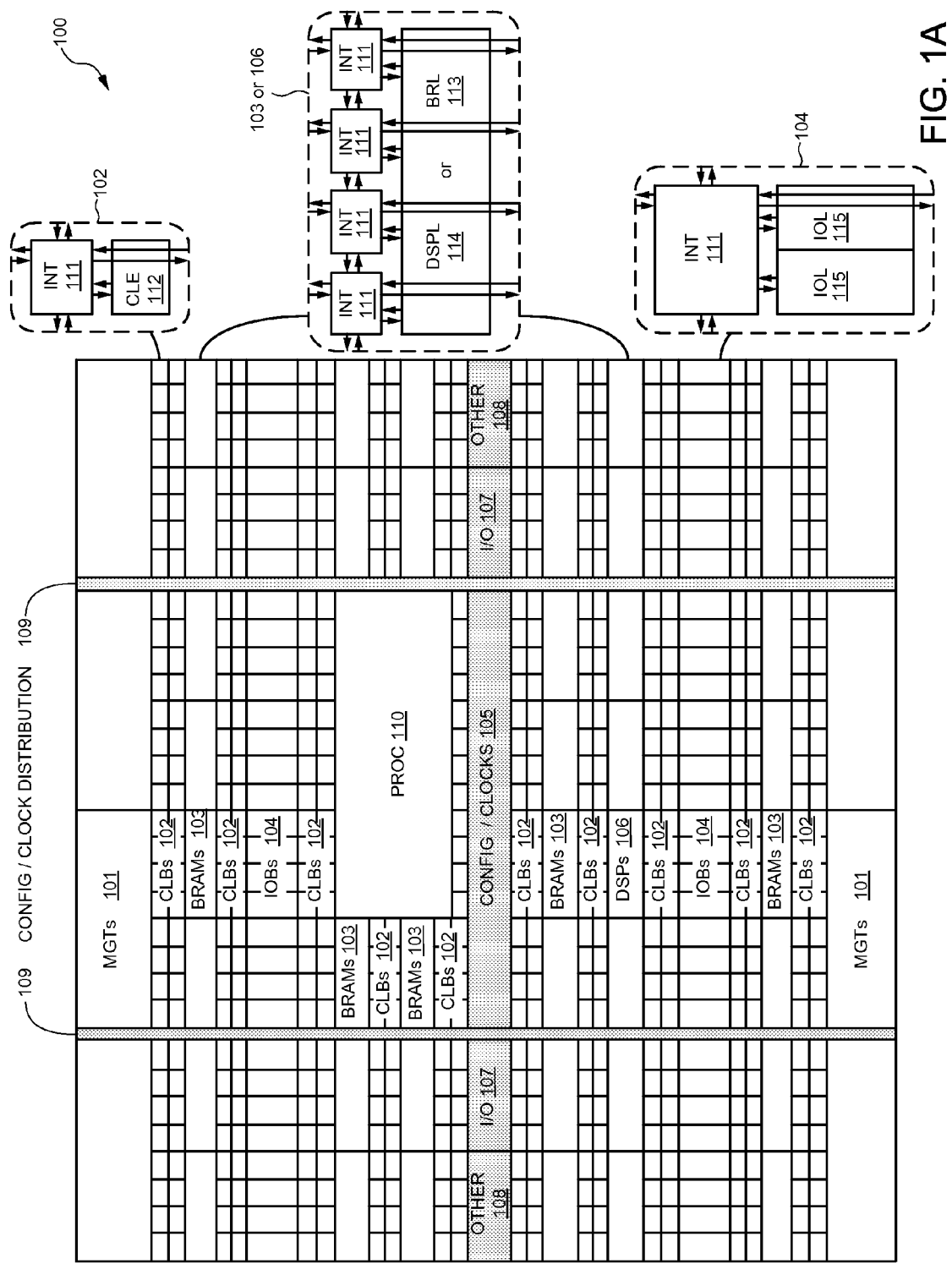
FIG. 1A is a simplified block diagram depicting an exemplary embodiment of a columnar Field Programmable Gate Array ("FPGA") architecture in which one or more aspects of the invention may be implemented.

FIG. 1A illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1A.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, which is rotated 90 degrees, a columnar area near the center of the die (shown shaded in FIG. 1A) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1A include additional logic blocks that disrupt the regular columnar structure making up a large part of the FPGA. The additional logic blocks can be programmable blocks and/or dedicated logic. For example, the processor block 110 shown in FIG. 1A spans several columns of CLBs and BRAMs.

Note that FIG. 1A is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1A are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex™-4 or Virtex™-5 FPGA from Xilinx, Inc. of San Jose, Calif. Although examples presented herein are illustrated using an example of an FPGA, the techniques and structures disclosed may generally be used with any devices, including integrated circuits such as processors and digital signal processors, in wireless systems.

With reference to wireless communication, prior to obtaining estimation for channel equalization and for channel demodulation, an OFDM symbol timing estimation is obtained. This is also referred to as block boundary detection or frame synchronization. Acquiring symbol timing estimations is different in broadcast and packet switched networks. Other formats than packets may be used. For example, a frame or other block of data may be used instead of a packet. For purposes of clarity by way of example and not limitation, it will be assumed that a random access packet switch system is used; however, it should be appreciated that other types of wireless networks employing OFDM or OFDMA or similar systems may be used.

Conventionally, a receiver does not initially know where a packet or frame starts, and thus an initial synchronization task is packet or frame detection. Once the frame or packet is detected, the next task is block boundary detection or symbol timing acquisition. Before data is demodulated, the receiver in an OFDM/OFDMA system needs to detect the starting point of the FFT window or OFDM symbol boundary. This task is referred to as block boundary detection. An agreed upon preamble is locally stored or otherwise accessible by a receiver. This allows use of a cross-correlation algorithm for acquiring symbol timing or detecting block boundary. The symbol timing may be resolved to sample-level precision by cross-correlating between the received preamble sequence and the locally stored preamble.

Figure 1B:
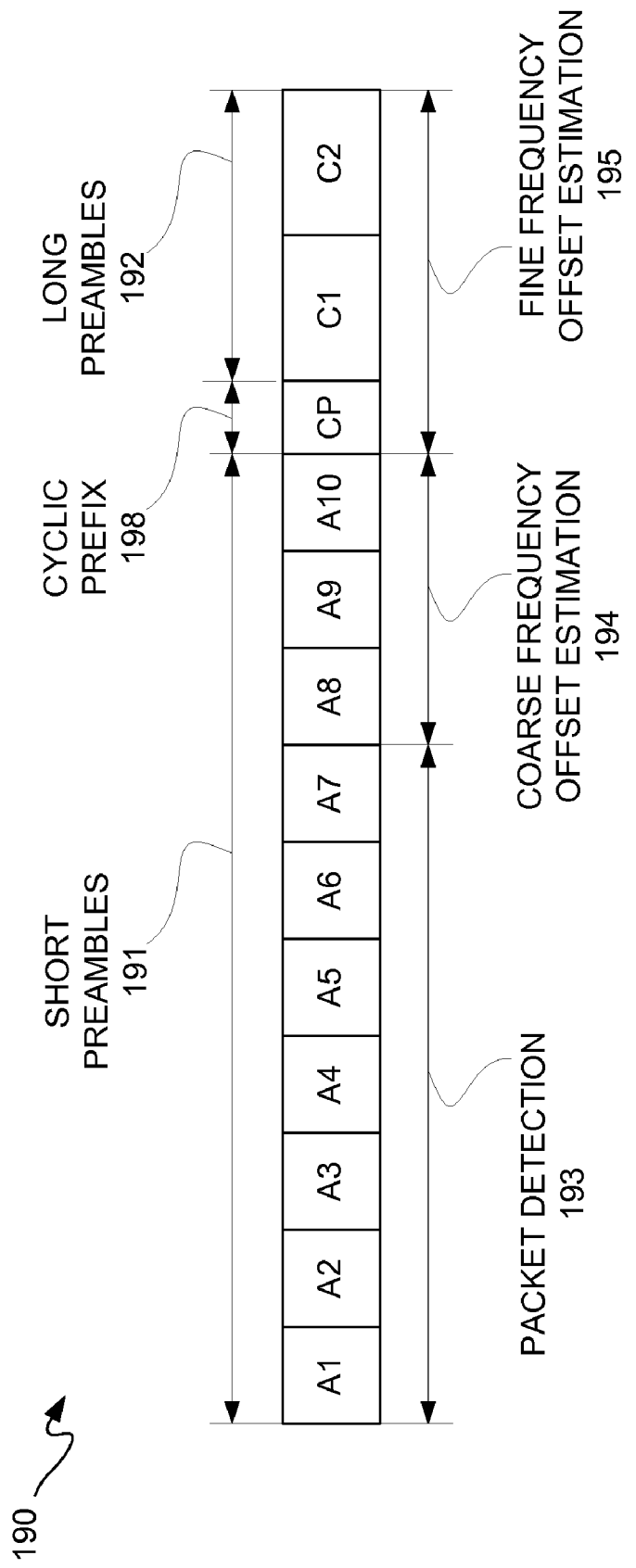
FIG. 1B is a block diagram depicting an exemplary embodiment of IEEE 802.11a compliant OFDM data packet preambles.

FIG. 1B is a block diagram depicting an exemplary embodiment of known OFDM preambles ("preambles") 190. Preambles 190 include short preambles 191, long preambles 192, and a cyclic prefix ("CP") 198. Although IEEE 802.11a—compliant OFDM preambles 190 are illustratively shown, it should be understood that other OFDM specifications may be used, including those mentioned elsewhere herein. For example, WiMax preambles similarly may be used with circuitry suitably modified for such preambles.

Short preambles 191 have ten short preambles A1 through A10, and long preambles 192 have two long preambles C1 and C2. Each short preamble A1 through A10 includes 16 digital samples which are all the same, and thus short preambles A1 through A10 each have the same sequence of digital samples. Each long preamble C1 and C2 includes 64 digital samples which are all the same, and thus long preambles C1 and C2 each have the same sequence of digital samples. Although 16 digital samples and 64 digital samples are described for purposes of clarity by way of example, it should be understood that other numbers of digital samples for short or long preambles, or both, may be used.

CP 198 is an exact replica of the last 16 samples of an OFDM symbol currently scheduled for transmission, such as preamble C1 of long preambles 192. Thus, continuing the above example of an IEEE 802.11a—compliant CP, CP 198 may have a length of 16 digital samples, namely, a 16 digital sample sequence.

It should be understood that initially a transmitter will send preamble information without data at the initiation of establishing a communications link or to indicate the beginning of a data block or frame. Once such communications link is established, or frame is detected, data symbols, each with a CP, may be sent. Preambles 190 are illustratively shown as information sets for establishing a communication link or for identifying the beginning of a data block.

Preambles 190 may be a part of an OFDM data packet. Preambles 190 are used for fine symbol timing estimation and channel estimation. More particularly, preambles A1 through A7 of short preambles 191 are used for an OFDM packet detection phase 193, namely packet detection, automatic gain control, and diversity selection. Preambles A8 through A10 of short preambles 191 are used for a coarse frequency offset estimation phase 194. Long preambles C1 and C2 of long preambles 192, together with CP 198, are used for a channel estimation and fine frequency offset estimation phase 195.

Alternatively, in an IEEE 802.16e system, a base station ("BS") of an IEEE 802.16e system transmits frames of data periodically. In a Time Division Duplexed ("TDD") system each frame has two parts, the downlink portion transmitted by the base station to the many subscriber stations ("SSs") followed by the uplink portion transmitted by many subscriber stations to the base station. The base station begins transmitting each frame with a preamble and follows that with control and data blocks. Then the base station and subscriber station switch roles, and the subscriber stations start transmission. This is called the uplink subframe wherein data is transmitted by many subscriber stations to the base station. The uplink does not have a preamble. The (downlink) preamble, in the time-domain, consists of a cyclic prefix ("CP") followed by three repeated sequences of preamble length M. The length of the preamble M and the cyclic prefix CP depend on the number of subcarriers and can be different for different base stations depending on the transmission bandwidth employed at such base stations. Here is the repetitive nature of the preamble similar to the preamble in the IEEE 802.11a system.

An OFDM signal includes N orthogonal subcarriers, for N a positive integer greater than 1, modulated by N parallel data streams with a frequency spacing 1/T, where T is symbol duration. When subcarrier frequencies $f_k=k/(NT)$, for $f_k$ the k-th frequency, are equally spaced, there exists a single baseband OFDM symbol without a CP that may be considered to be the aggregate of the N modulated subcarriers. For a data packet, a CP is conventionally appended to the data packet prior to serializing the data into a data sequence.

An IEEE 802.11a OFDM data packet ("data packet") may include 64 subcarriers, from which 48 may be used to transmit data. Four of sixteen non-data sub-carriers may be used to transmit pilot tones containing verification data. In such an implementation, each OFDM symbol may have a length of 64 digital samples, or $N_D=64$. An IEEE 802.16e system, on the other hand, has a variable number of subcarriers, such as 128, 512, 1024 or 2048 subcarriers, all depending on the transmission bandwidth. For the example of 128 subcarriers, there are 90 data subcarriers on the downlink (link from the base station to the subscriber station ("SS")) and 68 data subcarriers on the uplink. There are also 15 pilot subcarriers on the downlink and 34 pilot subcarriers on the uplink. For the other subcarrier embodiments, the pilot and data subcarriers scale accordingly. This can be found in the IEEE 802.16e specification.

An OFDM transmitter digitally generates each OFDM symbol of m symbols, including N modulated subcarriers, while modulating each OFDM symbol by n digital samples using an Inverse Fast Fourier Transform ("IFFT"). Both m and n are positive integers greater than 1. Consequently, at an OFDM receiver, which includes an OFDM packet detector, the OFDM signal may be demodulated using a Fast Fourier Transform ("FFT") over a time interval [0,NT]. A transmitted OFDM signal r(n) is propagated through a given transmission channel with a transmission function h(n), and after FFT demodulation at the OFDM receiver, the OFDM signal at an l-th subcarrier frequency is given by:

$$r(n) = s(n) * h(n) = \frac{1}{\sqrt{N}} \sum_{k=0}^{N-1} H_\ell x_{m,\ell} e^{j2\pi \frac{\ell n}{N}}, \text{ for } 0 < \ell < N-1, \quad (1)$$

where $H_l$ is the Fourier Transform of h(t) evaluated at frequency $f_l$.

Figure 2:
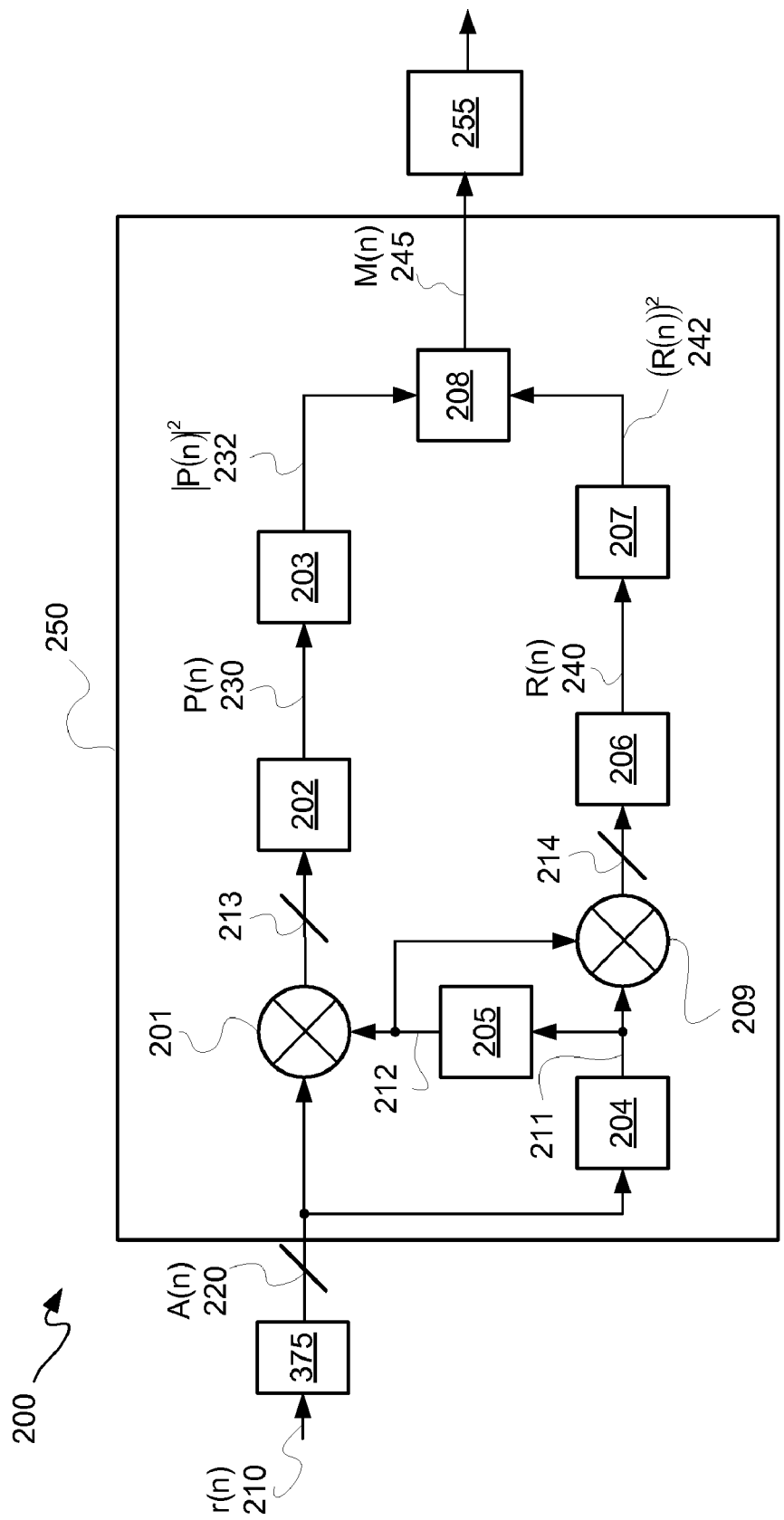
FIG. 2 is a block diagram depicting an exemplary embodiment of an OFDM packet detector with a sliding window short-preamble correlator.

FIG. 2 is a block diagram depicting an exemplary embodiment of an OFDM packet detector 200 with a sliding window short-preamble packet detector 250. OFDM packet detector 200 is described in co-pending U.S. Patent Application entitled "A PACKET DETECTOR FOR A COMMUNICATION SYSTEM" by Christopher H. Dick, assigned application Ser. No. 10/972,121, filed Oct. 22, 2004, which is incorporated by reference herein in its entirety for all purposes. With continuing reference to FIG. 2 and renewed reference to FIG. 1B, OFDM packet detector 200 is further described. As used herein, the terms "signal" and "sequence" refer to either or both of a single signal or multiple signals provided in parallel.

Sliding window short-preamble packet detector ("packet detector") 250 provides packet detection or frame detection and signal frequency offset estimation. In this exemplary embodiment, a known Schmidl and Cox Sliding-Window Correlator ("SWC") algorithm is applied to an IEEE 802.11a short preamble. Frequency and timing synchronization may be achieved by searching for a training pattern with a chosen length of M, for M a positive integer greater than 1, digital samples, such as A1 through A10 of short preambles 191, having two identical halves of length L=M/2. The sum of L consecutive correlations between pairs of digital samples spaced L time periods apart may be found as:

$$C(n) = \sum_{m=0}^{L-1} r^*_{n+m} r_{n+m+L}. \quad (2)$$

For IEEE 802.16e, the preamble is a pattern that is repeated three times and has a CP, and may be used much like the short preamble in IEEE 802.11a to achieve frequency and timing synchronization. The length M of the preamble depends on the number of subcarriers employed by the base station and can vary from base station to base station.

An input OFDM signal r(n) 210 received from the transmission channel is provided to re-quantizer 375 which provides a digital sequence A(n) 220 to packet detector 250. Accordingly, "high-precision" samples from r(n) 210 are provided to re-quantizer 375 and "low-precision" samples, for example 2-bit samples, are provided from re-quantizer 375 as digital sequence A(n) 220. Digital sequence A(n) 220 contains an array of N digital samples of width B1, where B1 is an integer larger than or equal to one. Sequence A(n) 220 has a width B1, and sequences 213 and 214, which are described below in additional detail, have widths B2, where B2 may be equal to B1. For example, both widths B1 and B2 may each be equal to 16 bits.

Digital sequence A(n) 220 is provided to packet detector 250. Packet detector 250 may be thought to have two correlators, namely, one correlator formed of multiplier 201 and moving average circuit 202 and another correlator formed of multiplier 209 and moving average circuit 206. Moving average circuits 202 and 206 may be thought of as sliding window averagers and may be implemented with filters.

Input digital sequence A(n) 220 of width B1 is provided to a multiplier 201 and to a delay element 204 as input. Delay element 204 provides output sequence 211, which is delayed relative to sequence A(n) 220 by a time interval D. Continuing the above example, time interval D is equal to the length of one symbol of short preambles 191. Delayed sequence 211 is provided to a conjugator 205 and to a multiplier 209 as respective inputs. Conjugator 205 changes the sign of an "imaginary" part of a complex number of an input signal provided thereto. For example, a complex number R=A+iB becomes a conjugated number R*=A−iB and vice versa, where A and B respectively are "real" and "imaginary" parts of complex number R and of conjugated complex number R*. Output of conjugator 205 is sequence 212, and sequence 212 is provided as input to digital multipliers 201 and 209.

Multiplier 201 multiplies sequence A(n) 220 by sequence 212, which is a delayed version thereof with imaginary numbers changed in sign; the output of multiplier 201 is output sequence 213. Moving average circuit 202 determines a moving average of sequence 213 to provide signal P(n) 230. Cross-correlation signal P(n) 230 is a result of cross-correlation between sequence A(n) 220 and a delayed and conjugated version of sequence A(n) 220. In the example above, the delay is by one short preamble interval. Signal P(n) 230, which is a cross-correlation signal, may be mathematically expressed as:

$$P(n) = \sum_{m=0}^{L-1} r_{n+m} r^*_{n+m+D}. \quad (3)$$

Thus, a cross-correlator formed of multiplexer 201 and moving average circuit 202 provides cross-correlation at a lag responsive to a delay introduced by delay unit 204. For example, the cross-correlator formed of multiplexer 201 and moving average circuit 202 performs a cross-correlation with a lag of 16 samples.

Multiplier 209 multiplies a delayed sequence A(n) 220, namely, sequence 211, with a delayed version thereof with imaginary numbers changed in sign, namely, sequence 212, to provide sequence 214 to moving average circuit 206. Moving average circuit 206 determines a moving average for sequence 214 to provide signal R(n) 240.

Thus, a cross-correlator formed of multiplexer 209 and moving average circuit 206 performs a cross-correlation at a lag of 0 samples, as both of sequences 211 and 212 are delayed by delay unit 204. Continuing the above example, this delay may be a short preamble interval D, and for IEEE 802.16e is one of the three time domain repetitions of the preamble. Recall that sequence 212 is a conjugated version of sequence 211. In other words, multiplexer 209 effectively squares input signal 211 to provide a power thereof, which result is output sequence 214.

The result of cross-correlation between signal 211 and conjugated signal 212, both of which are delayed by short preamble interval D, is signal R(n) 240. Signal R(n) 240 is used to determine the energy of signal r(n) 210 received by packet detector 250 within cross-correlation time interval D. Signal R(n) 240, which is an autocorrelation signal, may be mathematically expressed as:

$$R(n) = \sum_{m=0}^{L-1} r_{n+m+D} r^*_{n+m+D}. \quad (4)$$

Both cross-correlations are autocorrelations, except with different lags. For example, a cross-correlation to obtain R(n) 240 has a lag of 0 samples, and a cross-correlation to obtain P(n) 230 has a lag of 16 samples. Cross-correlation as used herein is for the same sequence. In other words, two versions of the same sequence are cross-correlated with each other in each cross-correlation. The term "autocorrelation" is meant to convey samples obtained from a same probabilistic event.

Moving average circuit 202 provides signal P(n) 230 to an arithmetic unit 203 as input. Arithmetic unit 203 provides a squaring/absolute value arithmetic operation for the signal P(n) to become |P(n)|². Arithmetic unit 203 provides signal |P(n)|² 232 to a divider unit 208 as numerator data input.

Moving average circuit 206 provides signal R(n) 240 to an arithmetic unit 207 as input. Arithmetic unit 207 provides a squaring operation for the signal R(n) to become (R(n))². Arithmetic unit 207 provides signal (R(n))² 242 to divider unit 208 as denominator data input.

Divider 208 provides a division operation for signal |P(n)|² 232 over signal (R(n))² 242 to become a signal M(n) 245, or:

$$M(n) = \frac{|P(n)|^2}{(R(n))^2}. \quad (5)$$

Divider unit 208 provides signal M(n) 245 as output of packet detector 250 to a demodulator 255, such as for example an OFDM demodulator, for further processing.

Equations (3) and (4) may be computed iteratively. A Cascaded Integrator Comb ("CIC") filter may be instantiated in configurable logic of an integrated circuit having programmable resources such as an FPGA, such as may be implemented for example in FPGA 100 of FIG. 1A. A CIC filter may be used to implement Equations (3) and (4). Accordingly moving average circuits 202 and 206 may be CIC filters 202 and 206, respectively, implement in configurable logic of an FPGA. Alternatively, CIC filters may be implemented with dedicated circuitry.

For a delay equal to one short preamble symbol, such as a 16 sample delay, or for IEEE 802.16e, a delay of length D, a shift register may be used, such as a shift register with a 16-bit length for a 16 sample or D sample delay. For a signal path that is 16 parallel signal lines, 16 shift registers each of a 16-bit length may be used. Shift register logic may be implemented in programmable logic of an FPGA platform to provide at least a 16-bit length. For computing cross-correlations as in Equations (3) and (4), CIC filters 202 and 206 may similarly use the same 16 sample delay in a differential section of each filter for computing P(n) and R(n). Taking into consideration node precisions of signal sequences of A(n), P(n) and R(n) for a complex-valued input signal 210, 2xDxB1+2xDxB2+2xDxB2 bits of storage may be used for storage in this particular embodiment. Additional details regarding an FPGA implementation of an OFDM physical layer interface ("PHY") may be found in "FPGA IMPLEMENTATION OF AN OFDM PHY," by Chris Dick and Fred Harris in IEEE Signals, Systems and Computers, 2003 Conference Record of the 37th Asilomar Conference, Vol. 1, 9-12 November 2003, pages 905-909.

Figure 3:
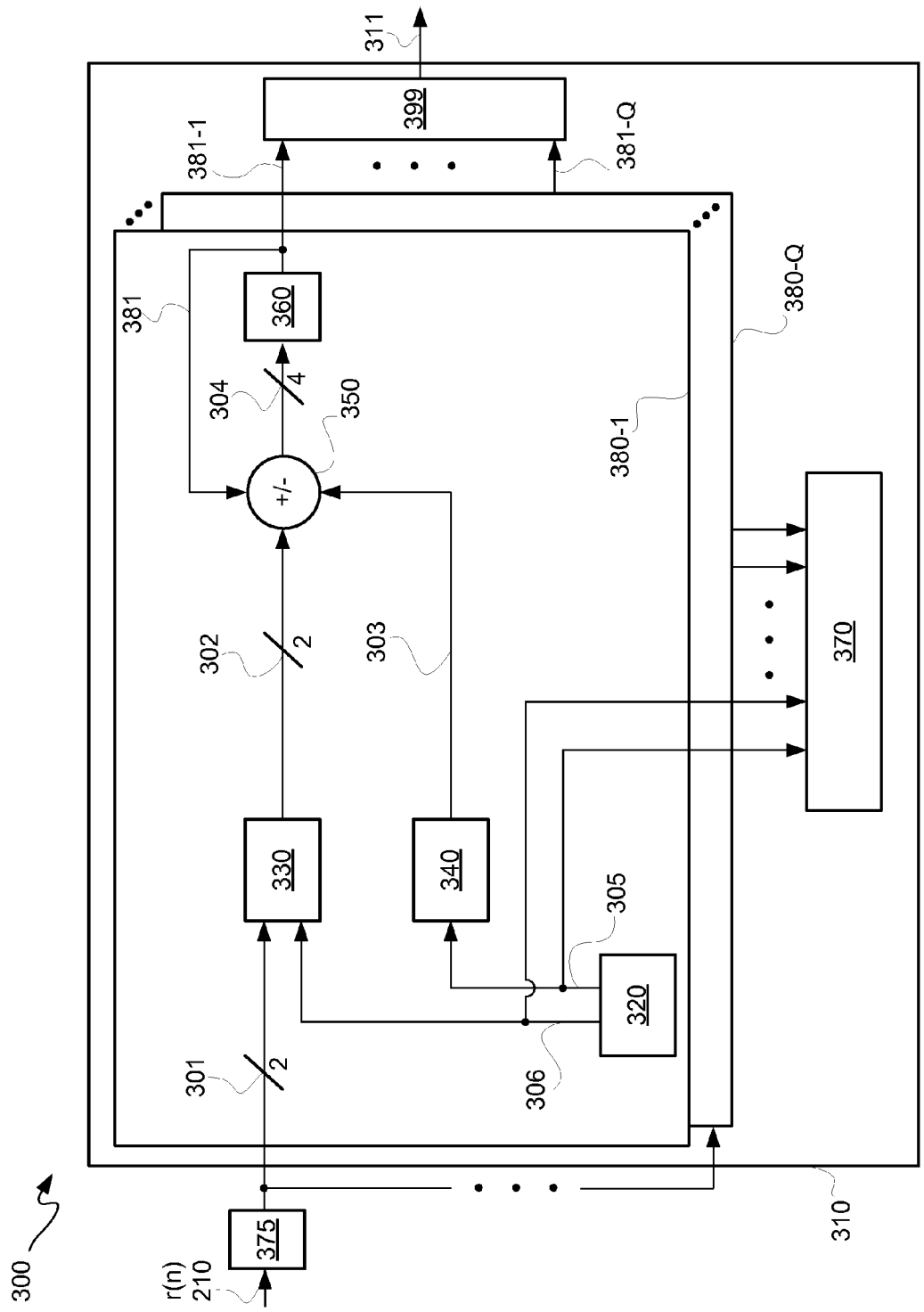
FIG. 3 is a block diagram depicting an exemplary embodiment of an OFDM packet detector with a sliding window long-preamble clipped cross-correlator.

FIG. 3 is a block diagram depicting an exemplary embodiment of an OFDM long preamble detector or "block boundary detector" 300 with a clipped cross-correlator ("correlator") 310. An example of an OFDM long preamble detector 300 is described in the previously referred to co-pending U.S. patent application Ser. No. 10/972,121. With continuing reference to FIG. 3, and renewed reference to FIGS. 1B and 2, block boundary detector 300 is further described.

Correlator 310 is configured to provide block boundary detection/symbol timing synchronization by calculating the cross-correlation between a received OFDM sequence, such as input sequence r(n) signal ("input sequence") 210, and a stored reference template, such as one of long preambles 192, such as long preamble C1 for example. As described above, long preamble C1 of long preambles 192 may for example be an IEEE 802.11a—compliant preamble. However, IEEE 802.16e does not have another preamble similar to the long preamble in IEEE 802.11a. But, the preamble which is the first OFDM block of the frame 250 may be used to serve the same purpose as the long preamble in IEEE 802.11a and may be used in correlator 310 to provide symbol timing synchronization by calculating the cross-correlation between the received sequence and the stored reference template.

Correlator 310 employs a clipped cross-correlation algorithm by using a sign of input sequence 210 and a sign of locally stored long preamble sequence C1 of long preambles 192 to indicate a positive or negative value of input sequence 210. The clipped cross-correlation algorithm in this embodiment depicted by FIG. 3 does not require usage of any multipliers, including without limitation use of any FPGA programmable logic-instantiated or embedded multipliers.

In an implementation, block boundary detector 300 may operate the clipped cross-correlation algorithm for correlator 310 at a clock rate which is at or near the same frequency as an FFT demodulation rate of OFDM packet detector 200 of FIG. 2, even though the frequency of input signal 210 may be substantially less, namely a fraction of the frequency of the FFT demodulation rate. For example, the FFT demodulation rate and the clock may be approximately 100 MHz, and the frequency of input signal 210 may be approximately 20 MHz. Although specific numerical examples are provided for purposes of clarity by way of example, it should be well understood that actual frequencies implemented may be close to these numerical examples or may substantially vary from these numerical examples.

Correlator 310 is configured with the clipped cross-correlation algorithm broken up into a number of shorter-length sub-correlations provided by a set of Processing Elements ("PEs"), such as PEs 380-1 through 380-Q, for Q a positive integer greater than 1. Output of each PE is a partial result. The partial results of PEs are combined, such as by an adder tree 399, to form a result 311.

Continuing the above example, long preamble C1 of long preambles 192 is a 64-sample sequence running at approximately a 20 MHz symbol rate. Each PE is responsible for computing one of five (e.g., 100/20=5) terms in what will be a result. For one C1, a total of thirteen (e.g., 64/5≈13) PEs are in correlator 310. The above-described numerical example is for purposes of clarity by way of example; however, many other numerical examples and implementations follow from the example PE, which implementations will depend at least in part on one or more of clock rate, symbol rate, and template length. However, IEEE 802.16e does not have another preamble similar to the long preamble in IEEE 802.11a. But, the preamble in IEEE 802.16e frame may be used for clipped cross correlation as well. The length of the preamble may be assumed to be M. As in the example above if the clock rate is higher than the symbol rate, each PE may be used to compute multiple terms as above (e.g., M/5 terms).

For each PE, such as PE 380-1, input samples from an OFDM signal r(n) 210 are re-quantized by re-quantizer 375 into 2-bit precision digital samples to provide a sequence of 2-bit samples 301 to correlator 310. In other words, high precision samples enter re-quantizer 375, which is configured to provide low, namely 2-bit, precision samples. From each PE, such as PE 380-1, 2-bit wide signal 301 is provided to regressor vector storage 330 as input. A "1-bit" correlator is described below with reference to FIG. 4 which uses less circuitry than this "2-bit" correlator 310.

Regressor vector storage 330 stores regressor vector information from signal 301 and provides five digital terms as a 2-bit wide regressor vector signal 302 responsive to an address, such as regressor vector address signal 306. Signal 302 has a value and sign for each symbol term provided in a parallel 2-bit digital format to represent ±1. Distributed memory of an FPGA may be used to store the sign of digital terms for each symbol in a long preamble received.

A memory address sequencer 320 generates a regressor vector address for regressor vector storage 330, which address is provided as regressor vector address signal 306. Regressor vector address signal 306 is provided to regressor vector storage 330 and a control unit 370 as input. Regressor vector storage 330 provides regressor vector signal 302 responsive to regressor vector address signal 306. Regressor vector signal 302 is provided to an addition-subtraction arithmetic unit ("adder/subtractor") 350 as input.

Memory address sequencer 320 generates a coefficient address for coefficient memory 340, which address is provided as address signal 305. Address signal 305 is provided to coefficient memory 340 and control unit 370 as input. Coefficient memory 340 may be used for locally storing coefficients or coefficient term vectors for cross-correlation. These coefficients are a long preamble, such as either C1 or C2. Thus, only a portion of a long preamble may be stored in coefficient memory 340.

In response to address signal 305, obtained from coefficient memory 340 is a coefficient term vector, which is provided as a 1-bit coefficient term signal 303 in this exemplary implementation. Adder/subtractor 350 performs a 1-bit precision addition or subtraction for two operands, namely, one operand is a 2-bit digital input sample from sequence 301 from regressor vector signal 302 and the other operand is the sign of a coefficient of coefficient term signal 303 from a reference template, such as long preamble C1 or C2, obtained from coefficient memory unit 340.

Continuing the example implementation, for approximately a 20 MHz data rate of the OFDM preamble, for each 50 ns interval, a five-term inner product is computed between the five 1-bit precision coefficients read from coefficient memory 340 and five 2-bit regressor vector terms obtained from regressor vector storage 330. Regressor vector storage 330 may be implemented with shift registers formed by programming slices of an FPGA, such as to provide a 16-bit long shift register as previously described. In an exemplary embodiment, a Shift Register Logic 16-bit length ("SRL16") configuration of a look-up table in an FPGA logic slice may be used to implement FPGA storage. Two bits are used to represent ±1 using a two's complement representation. For a sample size of 16 and a look-up table that is 16 entries deep for storing 16 samples (i.e., delay is 16 samples), 16 SRL16s may be used. This numerical example is specific to IEEE 802.11a but may be appropriately modified for IEEE 802.16e.

To recap, received regressor or regression vector terms are compared versus locally stored regression vector coefficients for an agreed upon preamble, which may be either long preamble C1 or C2 of long preambles 192. By re-quantizing to obtain 2-bit samples, an adder/subtractor 350 provides a 1-bit multiplication function without using a multiplier by using signs of input operands. The sign from each term of the received OFDM symbol of either associated long preamble C1 or C2 of long preambles 192 relative to the locally stored coefficients in a PE may be used.

Adder/subtractor 350 provides a comparison of the received regression vector information of a long preamble with stored regression vector information of a long preamble 192, and provides in this implementation a 4-bit wide vector comparison signal 304 as output. Precision correlation coefficients, which in this example are 1-bit precision, are encoded in a control plane of a PE because they are directly coupled to an addition/subtraction control port of an accumulator or decumulator. For example, when signal 303 is a logic 0, the combination of adder/subtractor 350 and delay unit 360 behaves as an accumulator. However, when coefficient term signal 303 is a logic 1, adder/subtractor 350 is configured as a subtractor, and the combination of adder/subtractor 350 and delay unit 360 behaves as a decumulator.

Digital signal 304 is provided to a delay unit 360 as input. Delay unit 360 may be implemented for example using a register for one unit of delay. Delay unit 360 delays discrete time domain signal 304 to provide a delayed time domain signal 381 as output. Delay unit 360 may feed back signal 381 to adder/subtractor 350 until full correction of each term of the portion of the regression vector handled by that PE is processed.

Delay unit 360 provides signal 381 as output of a PE; thus, signals 381-1 through 381-Q are output from PEs 380-1 through 380-Q, respectively. In the above example, output of all thirteen PEs 380-1 through 380-Q, for Q equal to 13 in this example, as signals 381-1 through 381-Q, respectively, are partial results which are combined by adder tree 399 to provide result signal 311.

Control unit 370 is configured to provide signaling (not shown for purposes of clarity) for clearing registers. Control unit 370 may be implemented with a finite state machine ("FSM") that clears register 360 at the start of a new integration interval. Continuing the above example, register 360 would be cleared every 5 clock cycles.

For a signaling rate of approximately 20 MHz, and recalling that the received signal and the long preamble are both complex valued time series, an arithmetic operations rate to support the above-described numerical example of correlator 310 may be approximately just over 5 million operations per second ("MOPs"), where a MOP is assumed to include all of the operation for computing one output sample, namely, data addressing and arithmetic processing (e.g., multiply-accumulate). However, by cross-correlating by using the sign of both the input sequence and the locally stored reference template, correlator 310 may be used to acquire symbol timing without using any embedded FPGA multipliers, thus saving circuit resources. Correlator 310, as well as block boundary detector 300, of FIG. 3, may be instantiated in an FPGA, such as FPGA 100 of FIG. 1A.

Figure 4:
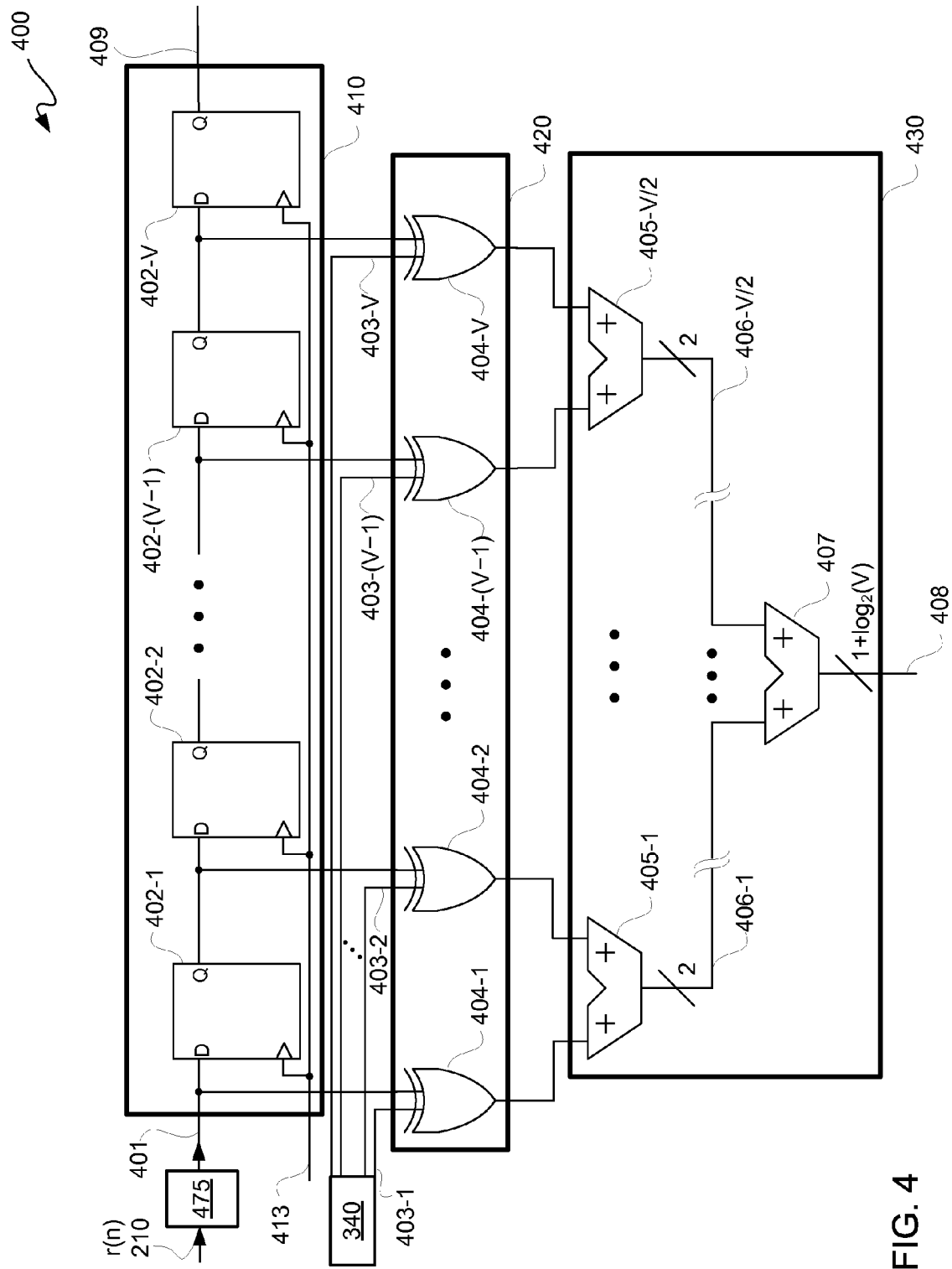
FIG. 4 is a block diagram depicting an exemplary embodiment of a clipped cross-correlator.

FIG. 4 is a block diagram depicting an exemplary embodiment of a correlator 400. Correlator 400, in contrast to correlator 310 of FIG. 3, is a "1-bit" correlator. More particularly, rather than having a re-quantizer 375 provide 2-bit digital samples 301 to correlator 310, a re-quantizer, such as re-quantizer 475, provides 1-bit samples 401 to shift register 410 and coefficient logic 420 of correlator 400. Thus, a sequence of input samples 401 of a 1-bit width is provided to shift register 410. Taps of shift register 410, namely taps associated with data input of each of flip-flops 402-1 through 402-V, for V a positive integer greater than one, are provided to respective inputs of exclusive OR ("XOR") gates 404-1 through 404-V of coefficient logic 420.

The other inputs to XOR gates 404-1 through 404-V respectively are coefficient MSBs 403-1 through 403-V, which may be provided from coefficient memory 340. Thus, it should be appreciated that the respective inputs to each of XOR gates 404-1 through 404-V may be MSBs for digital sample data shifted in over time, and MSBs for coefficients associated with a preamble. Thus, it should be appreciated that coefficient logic 420, and in particular XOR gates 404-1 through 404-V, act as respective 1-bit multipliers. Thus, an MSB of data is correlated with an MSB of a coefficient to provide the previously described cross-correlation, though with fewer bits and less circuitry.

A single-bit output is provided from each of XOR gates 404-1 through 404-V. Pairs of outputs of XOR gates, such as pairs of neighboring outputs from XOR gates 404-1 through 404-V, may be provided to respective input ports of adders 405-1 through 405-V/2 of binary adder tree 430. A sequence of bits 401 propagates through shift register 410 responsive to clock cycles of clock signal 413. The output of each adder 405-1 through 405-V/2 is a 2-bit output, namely a result bit and a carry bit, or more generally outputs 406-1 through 406-V/2. Outputs 406-1 through 406-V/2 may be propagated forward to provide other pairs of inputs for subsequent adders of binary adder tree 430. For example, for V equal to 4, outputs 406-1 and 406-2 would be respective inputs to a final adder 407. The bit width of output of adder 407 would be $1+\log_2(V)$, or in this example a 3-bit-wide output, namely 2 bits for the result and one carry bit. Output of adder 407 is more generally indicated as result signal 408.

It should be appreciated that shift register 410 is a regressor vector storage, such as regressor vector storage 330 of FIG. 3. Additionally, it should be appreciated that coefficient inputs 403-1 through 403-V may be obtained from coefficient memory, such as coefficient memory unit 340 of FIG. 3. As examples of re-quantization, regressor vector storage/access, and coefficient memory storage/access have been previously described, they are not repeated here for purposes of clarity.

Adders of binary adder tree 430 may, though need not, be implemented with actual adders; rather, they may be implemented using Look-Up Tables ("LUTs"). For example, for adding two bits, three LUTs per coefficient add may be implemented. It should be appreciated that because shift register 410 is scalable by adding or subtracting registers, and that coefficient logic 420 is correspondingly scalable by correspondingly adding or subtracting XOR gates, correlator 400 may be scaled to accommodate any of a variety of lengths. Likewise, binary tree 430 may be correspondingly scaled to add up outputs from coefficient logic 420.

Similar to IEEE 802.11a, it should be appreciated that for a WiMax 802.16e preamble, the ability to scale as well as reduce circuit resource usage by using only one MSB for both data samples and coefficients as described above, facilitates a relatively compact correlator. Furthermore, such a correlator may be instantiated in programmable logic of an FPGA, such as FPGA 100 of FIG. 1A, without having to resort to use of DSPs 106.

As previously indicated, complexity of a correlator depends in part on the number of complex-valued coefficients. The number of complex-valued coefficients or templates employs V complex multiplications and (V−1) complex additions, where V is the number of coefficient bits that may be input to a correlator at a time. Thus, continuing the above example, correlator 400 may have a preamble of 128 bits, namely 128 coefficients, input to it for purposes of correlation. However, rather than using multipliers, the V complex multiplications are done with XOR gates, which may be implemented in slices of programmable logic. In addition to the trade-off between uses of embedded multipliers, such as in DSPs 106, for programmable logic slices, it should further be appreciated that because such multipliers may have an input bit width substantially greater than 2 bits, use of programmable logic slices may be a more efficient use of circuit resources.

It should be appreciated that for complex-valued digital input, the number of complex multiplications V is actually 4V real multiplications and 2V real additions. In other words, for a complex number of a form A+iB for input data samples multiplied by a coefficient of the complex form a+ib, it should be appreciated that four separate data paths may be used to accommodate real values multiplied by real values, imaginary values multiplied by imaginary values, real values multiplied by imaginary values, and imaginary values multiplied by real values. In other words, separate correlators may be treated as independent blocks, with partial results of such correlators being summed up to provide a final result.

Figure 5:
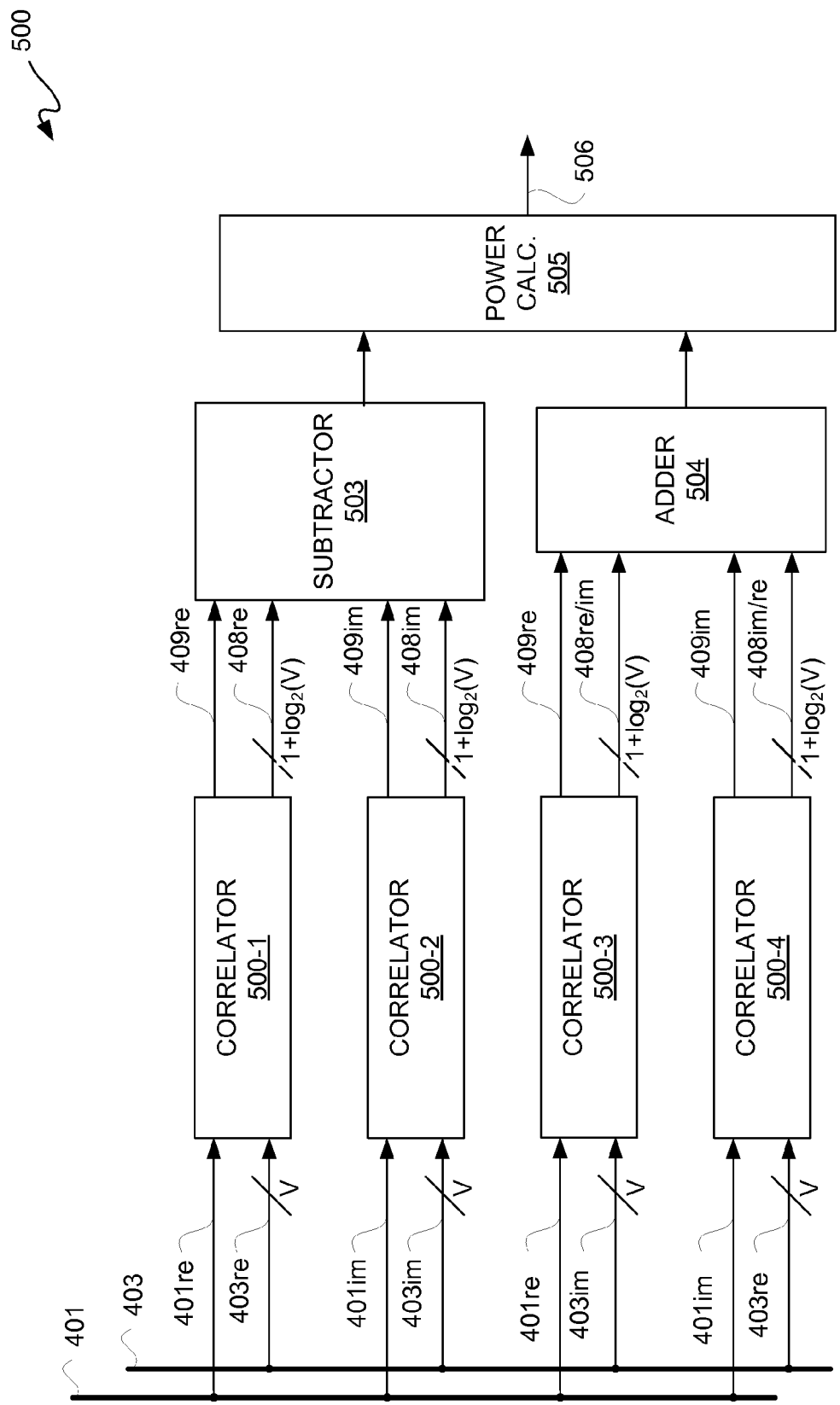
FIG. 5 is a block diagram depicting an exemplary embodiment of a complex correlator that includes four separate real correlators.

FIG. 5 is a block diagram depicting an exemplary embodiment of a correlator 500. Correlator 500 includes four separate correlators, namely correlators 500-1 through 500-4. Each of correlators 500-1 through 500-4 may be implemented using a correlator, such as correlator 400 of FIG. 4 or correlator 600 of FIG. 6. Input samples 401 may represent is a complex-valued number, and thus a real portion 401$re$ of input samples 401 is provided as an input to correlators 500-1 and 500-3. An imaginary portion 401$im$ of input samples 401 is provided to correlators 500-2 and 500-4. These input samples may be 1 or 2 bits. An example of a 1 bit input sample is described below.

Coefficient input 403 likewise may represent a complex-valued number. A real portion 403$re$ of coefficient input 403 is provided to correlators 500-1 and 500-4. An imaginary portion 403$im$ of coefficient input 403 is provided to correlators 500-2 and 500-3. Each of inputs 403$re$ and 403$im$ may have a bit width of V bits; however, only single bits, namely MSBs, are used, as previously described.

Accordingly, an output of correlator 500-1 is partial result 408$re$, having a 1+$\log_2$(V) bit width as previously described. An output of correlator 500-2 is partial result 408$im$, having a 1+$\log_2$(V) bit width as previously described. An output of correlator 500-3 is a real/imaginary partial result 408$re$/im, having a 1+$\log_2$(V) bit width as previously described, and an output of correlator 500-4 is an imaginary/real partial result 408$im$/re, having a 1+$\log_2$(V) bit width as previously described.

It should be appreciated that each of the partial results output respectively from correlators 500-1 through 500-4 are summed/subtracted to provide the real and imaginary outputs of correlator 500. The real and imaginary outputs may be squared and added to compute the power of the correlator output 506 Furthermore, as previously indicated, correlators 500-1 through 500-4 may be implemented using in part shift registers. Thus outputs of such shift registers may be delayed versions of digital samples input, namely correlators 500-1 and 500-3 provide real portion 409$re$ as delayed versions of real portion 401$re$, likewise correlators 500-2 and 500-4 provide imaginary portion 409$im$ as delayed versions of imaginary portion 401$im$.

Partial results output from correlators 500-1 and 500-2 are subtracted by subtractor 503, where partial result 408$re$ is subtracted from partial result 409$re$ and partial result 408$im$ is subtracted from partial result 409$im$. Partial results output from correlators 500-3 and 500-4 are added by adder 504, where partial result 408$re$ is added to partial result 409$re$ and partial result 408$im$ is added to partial result 409$im$. After subtracting by subtractor 503 and summing by adder 504, output from subtractor 503 and output from adder 504 may be provided to power calculator 505. Power calculation output 506 from power calculator 505 may indicate a packet, or frame or other block, boundary, namely by displaying a peak when a stored preamble template matches a received preamble transmitted. Such a received preamble may be transmitted by a base station for reception by a demodulator of a receiver having such correlators.

Figure 6:
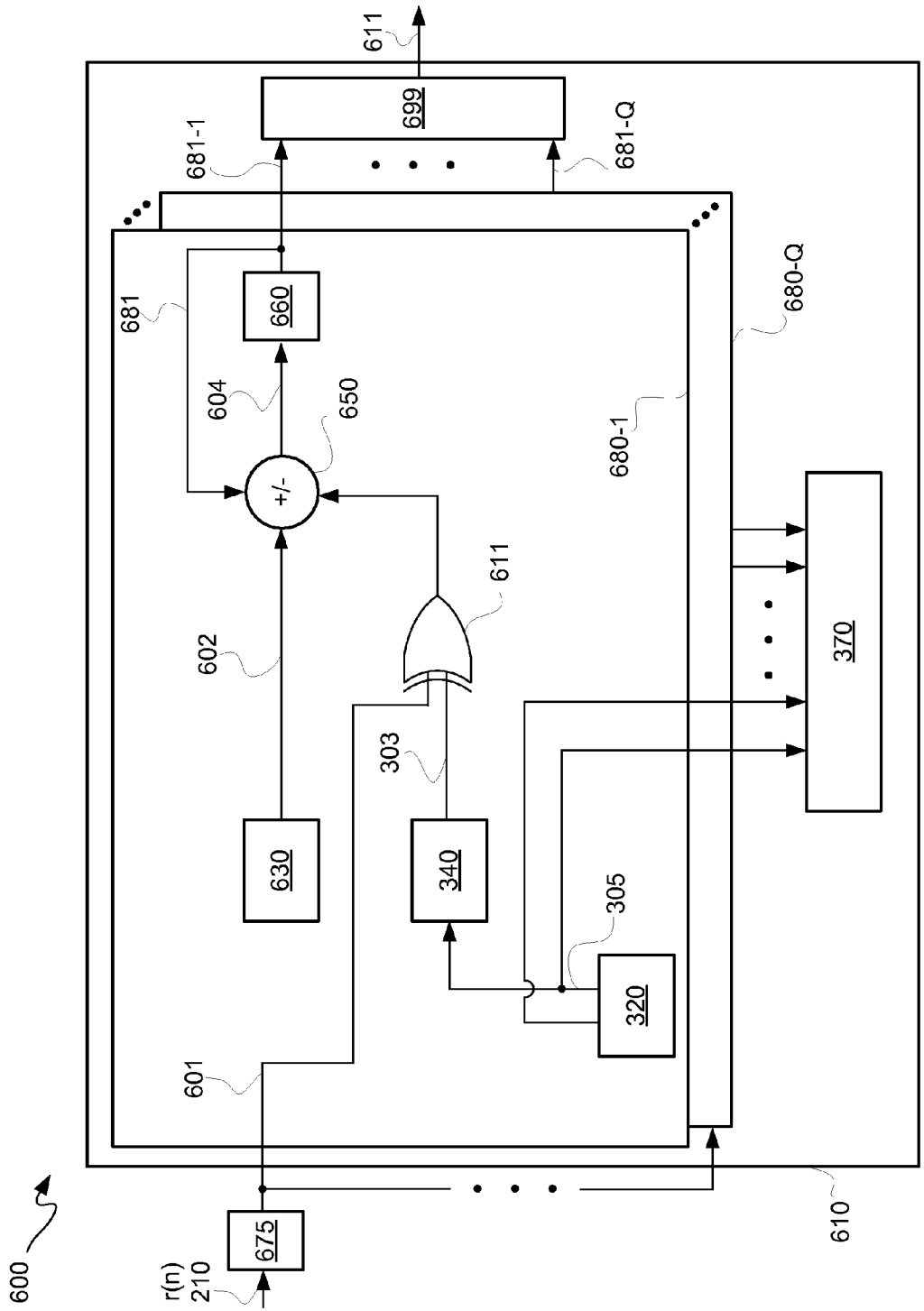
FIG. 6 is a block diagram depicting an exemplary alternative embodiment of the clipped cross-correlator of FIG. 4, when a system clock frequency is greater than a symbol clock rate.

Alternatively, if the system clock rate is higher than the symbol clock rate, XOR gates 404-1 through 404-V of FIG. 4 may be grouped into a PE and may compute multiple coefficients of a correlator. Along those lines, FIG. 6 is a block diagram depicting an exemplary alternative embodiment of an OFDM block boundary detector ("block boundary detector") 600 with a sliding window long-preamble clipped cross-correlator ("correlator") 610. Block boundary detector 600 and correlator 610 are respectively similar to block boundary detector 300 and correlator 310 of FIG. 3, and thus similar description is generally not repeated for purposes of clarity. Block boundary detector 600 may be used for block boundary detection for when a system clock frequency is sufficiently faster than a symbol clock rate, and thus some of the circuitry may be shared between the different terms, resulting in reduced overall circuitry usage.

Correlator 610 is configured with the clipped cross-correlation algorithm broken up into a number of shorter-length sub-correlations provided by a set of PE, such as PE 680-1 through 680-Q, for Q a positive integer greater than 1. Output of each PE is a partial result. The partial results of PEs are combined, such as by an adder tree 699, to form a result 611.

XOR gates 404-1 through 404-V and adder tree 430 of FIG. 4 provide higher throughput when the system clock is equal to the symbol clock. However, when the system clock rate is higher than the symbol rate, XOR gates 404-1 through 404-V may be grouped into a PE, such as XOR gates respectively of PEs 680-1 through 680-Q, for computing multiple coefficients of correlator 610, as previously indicated.

For each PE, such as PE 680-1, input samples from an OFDM signal r(n) 210 are re-quantized by re-quantizer 675 into 1-bit precision digital samples to provide a sequence of 1-bit samples 601 to each XOR gate, such as XOR gate 611 of PE 680-1, of correlator 610. Regressor vector storage 330 of FIG. 3 may be replaced with a constant output of a logic 1, namely constant output block 630 which may simply be a tie-off to a logic high voltage. Output of constant output block 630 is provided as an input to adder/subtractor 650. It should be understood that correlator 610 is "1-bit" correlator.

In response to address signal 305, obtained from coefficient memory 340 is a coefficient term vector, which is provided as a 1-bit coefficient term signal 303. Coefficient term signal 303 and sample signal 601 are provided as inputs to XOR gate 611, and output of XOR gate 611 is provided to a control port of adder/subtractor 650. If the output of XOR gate 611 is a logic 1, then adder/subtractor 650 operates as a subtractor. If the output of XOR gate 611 is a logic 0, then adder/subtractor 650 operates as an adder.

One of the data inputs to adder/subtractor 650 is a constant logic 1, and the other data input to adder/subtractor 650 is fed from delay unit 660 for providing delay and accumulation, as previously described. Adder/subtractor 650 performs a 1-bit precision addition or subtraction for a constant and an operand, namely the fed back accumulation. Digital signal 604 is output from adder/subtractor 650 and is provided to a delay unit 660 as input. Adder/subtractor 650 and delay unit 660 may be used to act as an accumulator or decumulator, as previously described.

Delay unit 660 delays discrete time domain signal 604 to provide a delayed time domain signal 681 as output and feeds back signal 681 to adder/subtractor 650 until full correction of each term of the portion of a regression vector handled by that PE is processed. Delay unit 660 provides signal 681 as output of a PE; thus, signals 681-1 through 681-Q are output from PEs 680-1 through 680-Q, respectively, which are partial results combined by adder tree 699 to provide result signal 611 output from 1-bit correlator 610.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for block boundary detection, comprising:
   receiving a signal;
   quantizing the signal to provide a quantized signal to at least one correlator, the quantized signal being a sequence of samples;
   cross-correlating as between the sequence of samples and a reference template including totaling partial results from the at least one correlator to provide a result, the result being a symbol timing synchronization responsive to the cross-correlating;
   the cross-correlating provided in part by combining by exclusive-ORing a regression vector obtained from the sequence of samples and a coefficient term vector obtained from the reference template.

2. The method, according to claim 1, wherein the signal is an Orthogonal Frequency Division Multiplexed carrier signal having orthogonal sub-signals; and wherein a single bit from the quantized signal is exclusive-ORed with a single bit from the coefficient term vector for each Most Significant Bit of the regression vector and the coefficient term vector.

3. The method, according to claim 2, wherein the regression vector is obtained from shift registering the quantized signal by the at least one correlator.

4. The method, according to claim 3, wherein the quantized signal is a sequence of single-bit samples.

5. The method, according to claim 4, wherein the reference template is a long preamble in any of IEEE 802.11a/g/n and a frame preamble in IEEE 802.16e.

6. The method, according to claim 1, wherein the signal received is a carrier signal of a Orthogonal Frequency Division Multiple Access system, the carrier signal having orthogonal subcarrier signals distributed among multiple subscriber stations of the Orthogonal Frequency Division Multiple Access system.

7. The method, according to claim 1, wherein the data block is either a packet or a frame; wherein the reference template is a stored preamble in a receiver; and wherein the regression vector is a received preamble of a current transmission being processed.

8. The method, according to claim 1, wherein the totaling is provided with a binary adder tree.

9. A method for block boundary detection for when a system clock frequency is sufficiently faster than a symbol clock rate, comprising:
   receiving an Orthogonal Frequency Division Multiplexed ("OFDM") signal having orthogonal sub-signals;
   quantizing the OFDM signal to provide a quantized signal, the quantized signal being a sequence of samples;
   obtaining a cross-correlation result as between the sequence of samples and a reference template in by:
      dividing the sequence of samples of correlation length L into respective portions of sub-correlation length N for L and N integers greater than zero;
      combining by respectively exclusive-ORing each sample within each of the portions of the sequence of samples with a respective coefficient obtained from the reference template to provide interim partial cross-correlation results; and
      adding the interim partial cross-correlation results to provide a cross-correlation result.

10. The method, according to claim 9, further comprising aggregating the partial cross-correlation results to provide the cross-correlation result.

11. The method, according to claim 10, wherein the correlation length L is determined by length of the reference template; and wherein one bit at a time from the sequence of samples is exclusive-ORed with one bit at a time from the reference template for providing L interim partial cross-correlation results each of a one-bit width.

12. The method, according to claim 11, wherein the sub-correlation length N is determined by a ratio of frequencies.

13. The method, according to claim 12, wherein the ratio of frequencies is a correlator frequency divided by a sub-correlator frequency.

14. A cross-correlator for a block of information detector, comprising:
   a re-quantizer coupled to receive an input, the input being an Orthogonal Frequency Division Multiplexed ("OFDM") signal having orthogonal sub-signals for providing symbols in parallel;
   sub-correlators coupled to the re-quantizer to obtain a sequence of samples responsive to the input, the sub-correlators including:
      an address sequencer configured to provide a sequence of vector addresses and an associated sequence of coefficient addresses;
      vector storage coupled to receive the sequence of samples and to store at least a portion of the sequence of samples, the vector storage coupled to receive a vector address of the sequence of vector addresses, the vector storage configured to provide a digital vector associated with a sample of the portion of the sequence of samples stored in the vector storage and located at the vector address received;
      coefficient storage coupled to receive a coefficient address of the sequence of coefficient addresses and configured to provide a digital coefficient responsive to the coefficient address received, the coefficient storage configured to store at least a portion of a preamble of a block of information;

an array of exclusive-OR gates coupled to receive the digital vector and the digital coefficient; and an adder tree coupled to the array of exclusive-OR gates configured to add output obtained from the array of exclusive-OR gates to provide a digital cross-correlation result to acquire symbol timing of the input.

15. The cross-correlator, according to claim 14, wherein the cross-correlator is a long-preamble clipped cross-correlator; wherein each exclusive OR-gate of the array of exclusive-OR gates receives a single bit associated with the digital vector and a single bit associated with the digital coefficient.

16. The cross-correlator, according to claim 15, wherein the adder tree is a binary adder tree such that each adder in an initial stage of adders receives two one-bit outputs from the array of exclusive-OR gates.

17. The cross-correlator, according to claim 16, wherein the sub-correlators are programmed into programmable logic of a programmable logic device.

18. The cross-correlator, according to claim 14, wherein the vector storage is instantiated in programmable logic; wherein the preamble is a long preamble of the block of information; and wherein the block of information is either a frame or a packet.

19. The cross-correlator, according to claim 18, wherein the programmable logic includes look-up tables configured to provide shift register functionality for the vector storage.

20. The cross-correlator, according to claim 14, wherein the sub-correlators do not include any multiplier.

* * * * *